US012598463B2

(12) United States Patent
Goyal

(10) Patent No.: US 12,598,463 B2
(45) Date of Patent: Apr. 7, 2026

(54) SYSTEMS AND METHODS AUTO-DISCOVER INSTANCES OF COMPUTE INSTANCES AND NETWORK COMPONENTS INSTANTIATED IN THE 5G CLOUD

(71) Applicant: Boost SubscriberCo LLC, Englewood, CO (US)

(72) Inventor: Priyanka Goyal, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 72 days.

(21) Appl. No.: 18/541,322

(22) Filed: Dec. 15, 2023

(65) Prior Publication Data

US 2025/0203366 A1 Jun. 19, 2025

(51) Int. Cl.
*H04W 12/08* (2021.01)
*H04W 12/00* (2021.01)
*H04W 12/61* (2021.01)
H04L 9/40 (2022.01)

(52) U.S. Cl.
CPC ......... *H04W 12/08* (2013.01); *H04W 12/009* (2019.01); *H04W 12/61* (2021.01); *H04L 63/10* (2013.01)

(58) Field of Classification Search
CPC ... H04W 12/08; H04W 12/009; H04W 12/61; H04L 63/10
See application file for complete search history.

(56) References Cited

U.S. PATENT DOCUMENTS

| | | | | |
|---|---|---|---|---|
| 2021/0392136 A1* | 12/2021 | Modi | .................... | H04W 12/06 |
| 2021/0409409 A1* | 12/2021 | Palanisamy | ............. | G06F 21/62 |
| 2022/0029881 A1* | 1/2022 | Aharon | ................... | H04L 67/51 |
| 2022/0158926 A1* | 5/2022 | Wennerström | ......... | H04L 43/20 |

* cited by examiner

*Primary Examiner* — Ellen Tran
(74) *Attorney, Agent, or Firm* — Kilpatrick Townsend & Stockton LLP

(57) ABSTRACT

A method of discovering components of a wireless network may include transmitting, by a computing system, an account identifier corresponding to an account associated with a cloud network to a credentialing service associated with the account. The method may include receiving a set of credentials from the credentialing service and accessing the cloud network. The cloud network may include a plurality of network components hosted on one or more compute instances. The method may include determining a list of the one or more compute instances within the cloud network. The method may include identifying data associated with each of the one or more compute instances. The method may include determining that a new compute instance of the one or more compute instances is recently instantiated. The method may include generating a record in a database may include at least a portion of the data associated with the new compute instance.

17 Claims, 8 Drawing Sheets

500

| | |
|---|---|
| Transmit an account identifier | 502 |
| Receive a set of credentials | 504 |
| Access a cloud network | 506 |
| Determine a list compute instances | 508 |
| Identify data associated with the compute instances | 510 |
| Determine the new compute instance is hosting a new network component | 512 |
| Generate a record in a database | 514 |

SYSTEMS AND METHODS AUTO-DISCOVER INSTANCES OF COMPUTE INSTANCES AND NETWORK COMPONENTS INSTANTIATED IN THE 5G CLOUD

BACKGROUND

Cellular networks include many components spread across different regions where a cellular network provider provides services. The components can include physical components as well as software components. Modern 5G open radio access network (O-RAN) cellular networks may include many components that instantiated in a cloud-based architecture. When a new compute instance is refreshed or instantiated, various systems of the 5G wireless network provider may need to identify the new compute instance and the components thereof.

BRIEF SUMMARY

A method of discovering components of a wireless network may include transmitting, by a computing system, an account identifier corresponding to an account associated with a cloud network to a credentialing service associated with the account. The method may include receiving, by the computing system, a set of credentials from the credentialing service. The method may include accessing, by the computing system, the cloud network. The cloud network may include a plurality of network components of the wireless network, the plurality of network components hosted on one or more compute instances. The method may include determining, by the computing system, a list of the one or more compute instances within the cloud network. The method may include identifying, by the computing system, data associated with each of the one or more compute instances. The method may include determining, by the computing system, that a new compute instance of the one or more compute instances is recently instantiated. The method may include generating, by the computing system, a record in a database may include at least a portion of the data associated with the new compute instance.

In some embodiments determining, by the computing system, that the new compute instance is a re-instantiated compute instance corresponding to a historical entry in the database, and that a new network component is hosted on the re-instantiated compute instance. The method may also include updating, by the computing system, the historical entry to include at least some of the data associated with the re-instantiated compute instance and/or the new network component.

In some embodiments, determining, by the computing system, a list of the one or more compute instances within the cloud network further may include determining, by the computing system, a set of clusters within a region of the cloud network. For each of the set of clusters, the method may also include determining, by the computing system, a set of compute instances of the one or more compute instances, the set of compute instances associated with the cluster. The method may also include updating, by the computing system, the database such that the records associated with the one or more compute instances are organized by cluster.

In some embodiments, the wireless network may include a open radio access network. The data may include at least one of an internet protocol address associated with the new compute instance and a port associated the new compute instance.

In some embodiments, the method may include determining, by the computing system, that a new network component is instantiated on a compute instance of the one or more compute instances. The method may include generating, by the computing system, a second record in the database may include data associated with the new network component. The new network component may include at least one of a distributed unit and a centralized unit.

A system may include one or more processors and a computer-readable medium including instructions that, when executed by the one or more processors, cause the computing system to perform operations. According to the operations, the system may transmit an account identifier corresponding to an account associated with a cloud network to a credentialing service associated with the account. The system may receive a set of credentials from the credentialing service. The system may access the cloud network, the cloud network including a plurality of network components of a wireless network. The plurality of network components may be hosted on one or more compute instances. The system may determine a list of the one or more compute instances within the cloud network. The system may identify data associated with each of the one or more compute instances and determine that a new compute instance of the one or more compute instances is recently instantiated. The system may generate a record in a database may include at least a portion of the data associated with the new compute instance.

In some embodiments, the system may determine that the new compute instance is a re-instantiated compute instance corresponding to a historical entry in the database, and that a new network component is hosted on a re-instantiated compute instance. The system may update the historical entry to include at least some of the data associated with the re-instantiated compute instance and the new network component. In some embodiments, determining a list of the one or more compute instances within the cloud network further may include determining a set of clusters within a region of the cloud network. For each of the set of clusters, the system may determine a set of compute instances of the one or more compute instances, the set of compute instances associated with the cluster. The system may update the database such that the records associated with the one or more compute instances are organized by cluster.

In some embodiments, the wireless network may include an open radio access network. The data may include at least one of an internet protocol address associated with the new compute instance and a port associated the new compute instance. The set of credentials may expire in eight hours. The plurality of network components may be included in at least one of a distributed unit and a centralized unit. The system may perform the operations according to a predetermined interval less than an expiry time of the set of credentials.

A non-transitory computer-readable medium may include instructions that cause one or more operations. The operations may include transmitting, by a computing system, an account identifier corresponding to an account associated with a cloud network to a credentialing service associated with the account. The operations may include receiving, by the computing system, a set of credentials from the credentialing service. The operations may include accessing, by the computing system, the cloud network. The cloud network may include a plurality of network components of the wireless network, the plurality of network components hosted on one or more compute instances. The operations may include determining, by the computing system, a list of the one or more compute instances within the cloud network. The operations may include identifying, by the computing system, data associated with each of the one or more compute instances. The operations may include determining, by the computing system, that a new compute instance of the one or more compute instances is recently instantiated. The operations may include generating, by the computing system, a record in a database may include at least a portion of the data associated with the new compute instance.

In some embodiments, the operations may include determining, by the computing system, that the new compute instance is a re-instantiated compute instance corresponding to a historical entry in the database, and that a new network component is hosted on the re-instantiated compute instance. The operations may include updating, by the computing system, the historical entry to include at least some of the data associated with the re-instantiated compute instance and/or the new network component.

In some embodiments, the operations may include determining, by the computing system, a list of the one or more compute instances within the cloud network. The operations may include determining, by the computing system, a set of clusters within a region of the cloud network. For each of the set of clusters, the operations may include determining, by the computing system, a set of compute instances of the one or more compute instances, the set of compute instances associated with the cluster. The operations may include updating, by the computing system, the database such that the records associated with the one or more compute instances are organized by cluster. The wireless network may include an open radio access network. The plurality of network components may be included in at least one of a distributed unit and a centralized unit.

DETAILED DESCRIPTION

Figure 1:
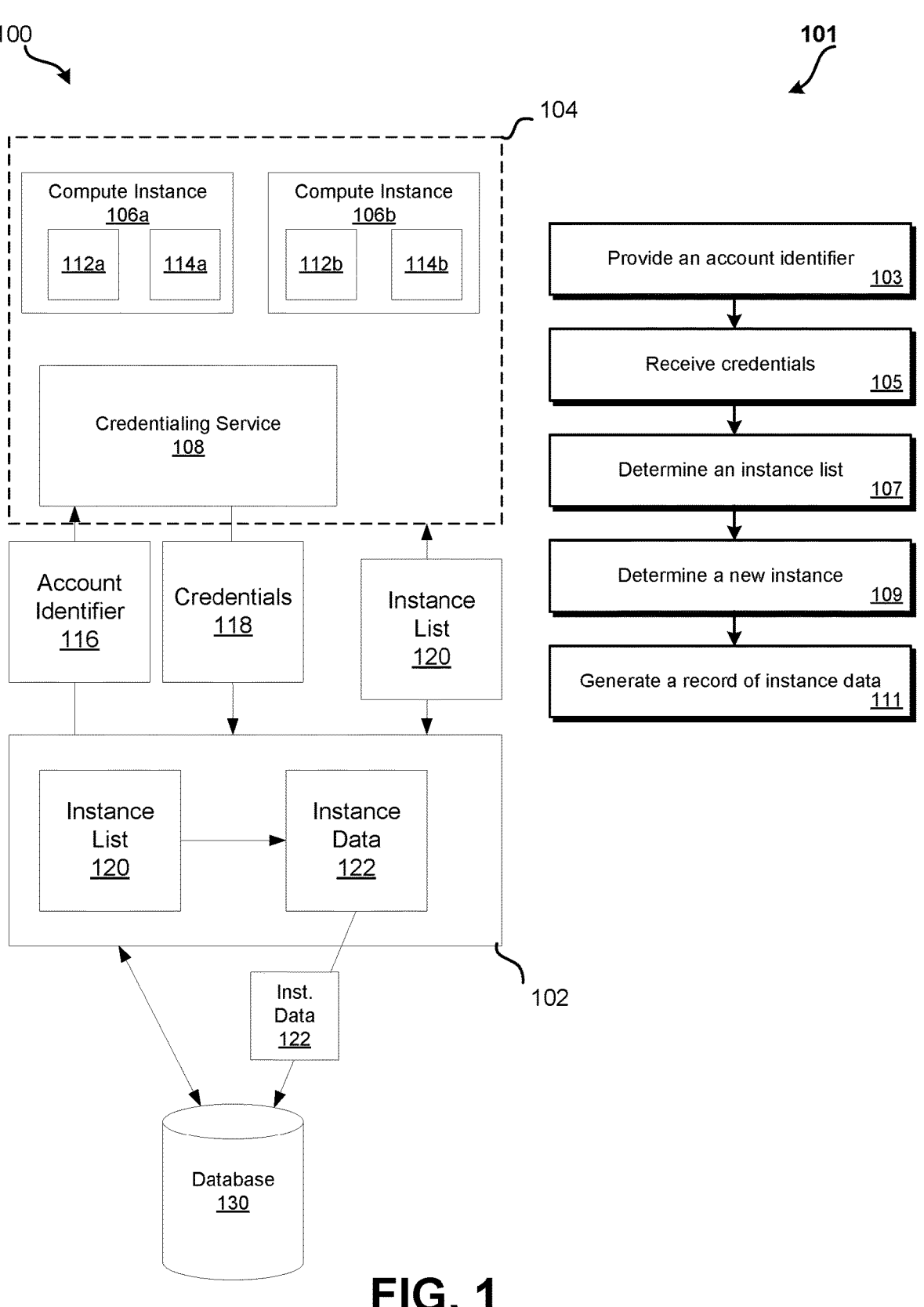
FIG. 1 illustrates a system and a process for automatically discovering new network components, according to certain embodiments.

Providing wireless service to user equipment may require many different network components working in concert. The network components may be hardware, located at or near specific sites such as a cell tower, or may be located in datacenters or other off-site locations. The network components may also include software components, hosted on a physical machine and/or on a compute instance of a cloud network. Legacy wireless networks (e.g., 4G LTE) and standard 5G wireless networks may have some number of network components implemented on cloud based compute instances. Other wireless networks may be more reliant on cloud based implementations, such as a 5G wireless network using a cloud-based open radio access network (O-RAN).

During the operation of a 5G O-RAN, the compute instances hosting various network components may occasionally go offline, as part of routine maintenance, an outage, or some other reason. Additionally, when wireless service is expanded or altered in some way, a new compute instance may be instantiated, and new network components hosted on the new compute instance. In both cases, the new compute instance (and new network components) may not be immediately visible to all interested parties. For example, the new network components may be associated with an entity other than a 5G wireless network provider. The entity may provide the new network components for the 5G wireless network provider in order to perform some service for the 5G wireless network provider.

While the entity may have knowledge of the new network component, the 5G wireless network provider may desire to discover the new network components on their own. To discover new network components, the 5G wireless network provider may access a region of the cloud network, the region implementing the new compute instances (and/or other compute instances associated with the entity). To do so, the 5G wireless network provider may obtain credentials in order to authenticate to the region and scan the region for new compute instances. The compute instances and the network components thereon are associated with the entity, and thus require credentials associated with an account held by the entity. The 5G wireless network provider may import credentials for the account associated with the entity, and then use the imported credentials to access the region. However, the imported credentials may expire after some period (e.g., every eight hours). The 5G wireless network provider may therefore be required to import new credentials before the imported credentials expire in order to keep apprised of any new compute instances and/or new network components within the region. As compute instances may be instantiated often, the manual importing of credentials needed to discover a new compute instance and/or network component may lead to new instantiations of compute instances being missed.

If a new network component is missed, the 5G wireless network provider may not be able to provide data associated with the new network component to other network components. For example, the new network component may be instantiated in order to expand cellular service in a given area. Other network components may require the data (e.g., and internet protocol (IP) address) associated with the network component in order to operate normally. If the 5G wireless network provider is unaware of the new network component, the 5G wireless network provider may not be able to provide the data to the other network components. The other network components may not be able to communicate with the new network components, and the cellular service may therefore be degraded and/or interrupted.

These problems may impact the cellular service provided in the area when just one network component, associated with one entity and hosted on a single compute instance in a single region of a cloud network. 5G wireless networks using an O-RAN, however, may include several network components, associated with several respective entities, and hosted on multiple compute instances in multiple regions.

The impact of missing new network components and/or new compute instances may therefore be exacerbated. Accordingly, there is a need to automatically discover new compute instances across multiple regions associated with multiple entities (or accounts) in order to prevent cellular service degradation and/or reduce network downtime.

One solution may be for a computing system of the 5G network provider to access various regions to scan for new compute instances automatically. To do so, the computing system may access an account identifier associated with an entity administering a network component. The account identifier may be used in some or all of the regions of a cloud network associated with the entity, or each region may require a unique account identifier. The computing system may provide the account identifier to a credentialing service associated with the entity and receive a set of credentials in return. Then, the computing system may scan the region(s) to discover some or all of the compute instances instantiated in the region. The computing system may identify data associated with region (e.g., namespace, node name, etc.), compute instances (e.g., cluster name, IP addresses, etc.), and network components hosted in the compute instances (e.g., IP addresses, component type, etc.). the computing system may then determine that a compute instance within the region has recently been instantiated, and is thus a new compute instance. The computing system may then log the new compute instance and/or the data associated with the region, the new compute instance, and any network components thereon in a database. The database may then be accessed by the 5G wireless network provider and/or other entities in order to obtain updated information about the network components hosted on the new compute instance. This process may be run according to a schedule (e.g., every minute, every 30 seconds, etc.) such that the database is frequently updated. Thus, new network components may be discovered automatically and updated leading to improved cellular service and/or reduced network downtime.

FIG. 1 illustrates a system 100 and a process 101 for automatically discovering new network components, according to certain embodiments. The system 100 may include a computing system 102 a region 104 of a cloud network. The computing system 102 may be associated with a 5G wireless network provider that provides cellular service via a cloud-based O-RAN. The computing system 102 may be implemented in whole or in part on the cloud network, or may be implemented on a physical machine. The region 104 may be hosted on a publicly available cloud network as part of the O-RAN of the 5G wireless network provider. The region 104 may include compute instances 106a-b and the credentialing service 108. The compute instances 106a-b may implement network components 112a-b and 114a-b, respectively. The network components 112a-b and 114a-b may include one or more software components associated with an entity that provides functionality to the 5G wireless network provider (e.g., back-end services etc.). The network components 112a-b and 114a-b may also include one or more network functions, such as a charging function (CHF), session management function (SMF), and other such network functions.

The credentialing service 108 may be configured to provide credentials in response to an account ID associated with the region. For example, the credentialing service 108 may be configured to provide credentials for all accounts associated with entities hosting compute instances on the region 104. In other example, the credentialing service 108 may be associated with just one entity, providing access to only those compute instances associated with the entity.

Alternatively, the credentialing service 108 may be implemented outside of the region 104. The credentialing service 108 may then provide credentials for any region associated with an account ID (e.g., the entity). One of ordinary skill in the art would recognize many different possibilities and configurations.

At step 103, the computing system 102 may provide an account identifier 116 to the credentialing service 108. The account identifier (ID) 116 may be associated with an entity associated with the compute instances 106a-b and/or the network components 112a-b and 114a-b. The account ID 116 may be associated with the account of the entity for the region 104 (as shown in FIG. 1) or may be associated with each region on which the entity implements network components and/or compute instances. The account ID 116 may be accessed by the computing system 102 from a database 130 and/or some other storage mechanism. The account ID 116 may be originally provided to the computing system 102 by the entity associated with the compute instances 106a-b and/or the network components 112a-b and 114a-b. The credentialing service 108 may be implemented on the cloud network within the region 104 or may be implemented on a different region of the cloud network.

At step 105 the computing system 102 may receive a set of credentials 118 from the credentialing service 108. The set of credentials 118 may be used to provide access to the region 104 for the computing system 102. In some embodiments, the set of credentials may be used for multiple regions associated with the account ID 116. The set of credentials 118 may have an expiry time (e.g., every 1 hour, every 2 hours, every 8 hours, etc.). The computing system 102 may therefore provide the account ID 116 and receive the set of credentials 118 at some interval less than the expiry time (e.g., every minute).

At step 107, the computing system may determine an instance list 120. The instance list 120 may indicate each compute instance instantiated within the region 104. In the example shown in FIG. 1, the instance list 120 may therefore indicate that the compute instances 106a-b are instantiated within the region 104. The instance list 120 may include data relating to the region 104, such as a node name identifying the region 104, a namespace (e.g., naming conventions of any compute instances instantiated within the region 104). The instance list 120 may also include data relating to the compute instances 106a-b such as an IP address of each compute instance 106a-b, a cluster name associated with the compute instances 106a-b, and other such data. The instance list 120 may further include data relating to any network components hosted on the compute instances 106a-b (e.g., the network components 112a-b and 114a-b) such as a component type, component name, port numbers, IP addresses of the network components 112a-b and 114a-b, and other such data.

At step 109, the computing system 102 may determine that the region 104 includes a new compute instance and/or a new network component. To do so, the computing system 102 may compare the data included in the instance list 120 against historical data stored in the database 130. The historical data may indicate the compute instances instantiated on the region 104 as determined by a previous execution of the process 10. For example, during the previous execution of the process 101, the computing system 102 may have discovered the compute instance 106a with the network components 112a and 114a. The database 130 may therefore include data relating to the compute instance 106a and the network components 112a and 114a. The compute instance 106b, however, may be recently instantiated (e.g., a new compute instance instantiated to expand cellular service). Thus, the database 130 may not include any data relating to the compute instance 106*b* and/or the network components 112*b* and 114*b*.

In another example, compute instance 106*b* may be a re-instantiation of a previous compute instance. The computing system 102 may determine this by comparing data associated with the compute instance 106*b* stored in the database 130 to the relevant data included in the instance list 120. For example, an IP address of the compute instance 106*b* may have changed, while identifiers of the network components 112*b* and 114*b* remain unchanged (thus indicating that 106*b* is a re-instantiation). Additionally or alternatively, one or both of the network components 112*b* and 114*b* may be new, as determined from the data in the database 130 and the instance list 120.

At step 111, the computing system 102 may generate a record of instance data 122 relating to the new compute instance. For example, if the compute instance 106*b* is determined to be a new instantiation, a new entry may be made in the database 130. The new entry may include the IP address of the compute instance 106*b*, information relating to the network components 112*b* and 114*b*, and other such information. In another example, the compute instance 106*b* may be a re-instantiation and/or one or more of the network components 112*b* and 114*b* may be new network components. Then, the instance data 122 may be generated such that an entry corresponding to the compute instance 106*b* is updated to include the relevant information. In either case, the database 130 may now include data associated with both of the compute instances 106*a-b* and the network components 112*a-b* and 114*a-b*, hosted thereon.

Although only the region 104 is shown, it should be understood that any number of regions hosting any number of compute instances and/or network components may be present. Likewise, any number of entities may be associated with the regions, each entity associated with one or more network components. The regions associated with the entities may be accessed by a unique set of credentials, obtained using unique account IDs.

By using the process 101, the computing system 102 may automatically discover any new compute instances and/or network components hosted thereon. The computing system may perform the process 101 at some interval (e.g., every minute), shorter than an expiry of the set of credentials 118 in order to provide near real-time data relating to the region 104 and any compute instances and/or network components. Furthermore, because the computing system 102 may perform the process 101 at the interval, the database 130 may be updated more frequently than the expiry of the set of credentials 118, reducing service disruptions in the cellular service.

Figure 2:
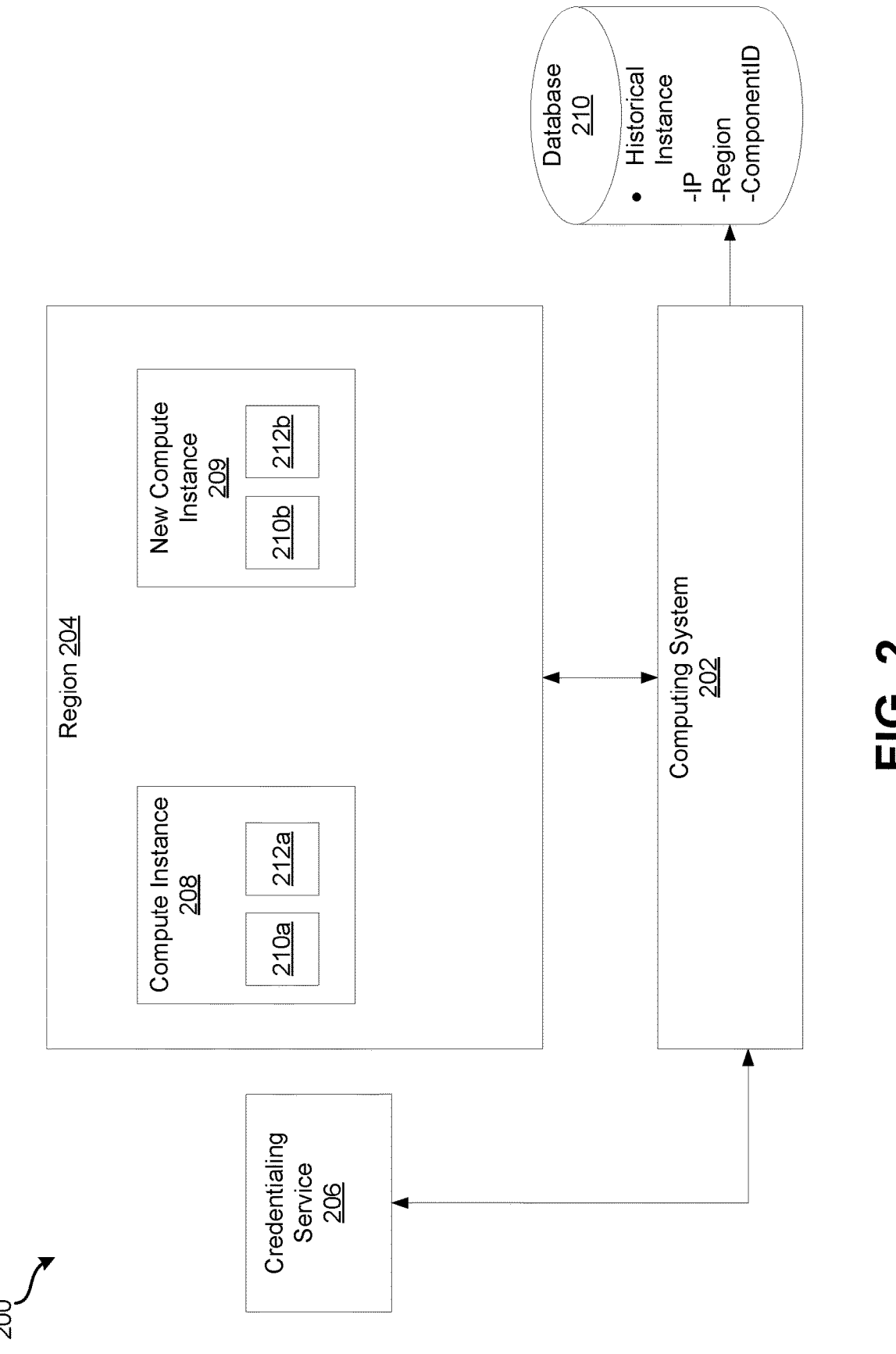
FIG. 2 illustrates a system for accessing a region implementing instances of network components and for providing a 5G wireless network, according to certain embodiments.

FIG. 2 illustrates a system 200 for accessing a region 204 implementing instances of network components 210*a-b* and 212*a-b* for providing a 5G wireless network, according to certain embodiments. The system 200 may be similar to some or all of the system 100 described in FIG. 1, and thus include similar components and functionalities. The system 200 may includes a computing system 202, a region 204 of a cloud network, a credentialing service 206, and a database 210. The computing system 202 may be associated with a 5G wireless network provider providing the 5G wireless network. The 5G wireless network may include an O-RAN implemented in a cloud-based architecture. Some or all of the network components of the 5G wireless network, may be instantiated in the region 204 (e.g., the network components 210*a-b* and 212*a-b*). The region 204 may be part of a cloud network, hosted by a publicly available cloud provider and associated with an entity associated with the network components 210*a-b* and 212*a-b*. Although only one region is shown, there may be any number of regions present within the system 200.

The region 204 may implement compute instance 208 and new compute instance 209. The compute instance 208 may host the network components 210*a* and 212*a*. The network components 210*a* and 212*b* may include a software component, provided by the entity to perform operations for the 5G wireless provider such that cellular service may be provided to UEs. The network components 210*a* and 212*b* may also include one or more network functions of a 5G wireless network (e.g., a CHF, SMF, etc.). The network components 210*a* and 212*a* may be included in a distributed unit (DU) or centralized unit (CU) of the 5G wireless network.

The new compute instance 209 may be a new instantiation or a re-instantiation. If the new compute instance 209 is a new instantiation, the network components 210*b* and 212*b* may be new network components (e.g., instantiated to expand the cellular service). If the new compute instance 209 is a re-instantiation, some data associated with the new compute instance 209 may have changed and/or one or more of the network components 210*b* and 212*b* may be new network components. The network components 210*b* and 212*b* may be included in a DU or CU of the 5G wireless network.

The credentialing service 206 may be configured to return a set of credentials (e.g., the set of credentials 118 in FIG. 1) in response to receiving an account ID associated with the entity (e.g., the account ID 116). The credentialing service 206 may provide the set of credentials for the region 204 and/or any other regions associated with the entity. The credentialing service 206 may be implemented separate from the region 204 (as shown in FIG. 2) or may be implemented within the region 204.

The computing system 202 may access the region 204 to scan the region 204 for new compute instances and/or network components. The computing system 202 may access an instance list (e.g., the instance list 120) from the region 204. Additionally or alternatively, the computing system 202 may generate the instance list. The instance list may include data relating to the region 204, the compute instance 208, the new compute instance 209, and/or the network components 210*a-b* and 212*a-b*. The computing system 202 may compare the data of the instance list to data stored in the database 210. The data stored in the database 210 may include data associated with one or more historical instances. For example, the database 210 may include data associated with the compute instance 208 such as an IP address, a region (e.g., corresponding to the region 204), component IDs of the network components 210*a* and 212*a*, and other such information. Because the new compute instance 209 may be a new instantiation and/or a re-instantiation, the database 210 may or may not include any historical instance data associated with the new compute instance 209.

The computing system 202 may also determine a set of clusters within the region. Each cluster of the set of clusters may include one or more compute instances with one or more network components. In some embodiments, each cluster may include similar network components. That is, each cluster may include a number of different network functions operating in concert to provide service for the 5G wireless network provider. In other embodiments, each cluster may be characterized by instances of various network components such that each cluster performs a different function.

Figure 3:
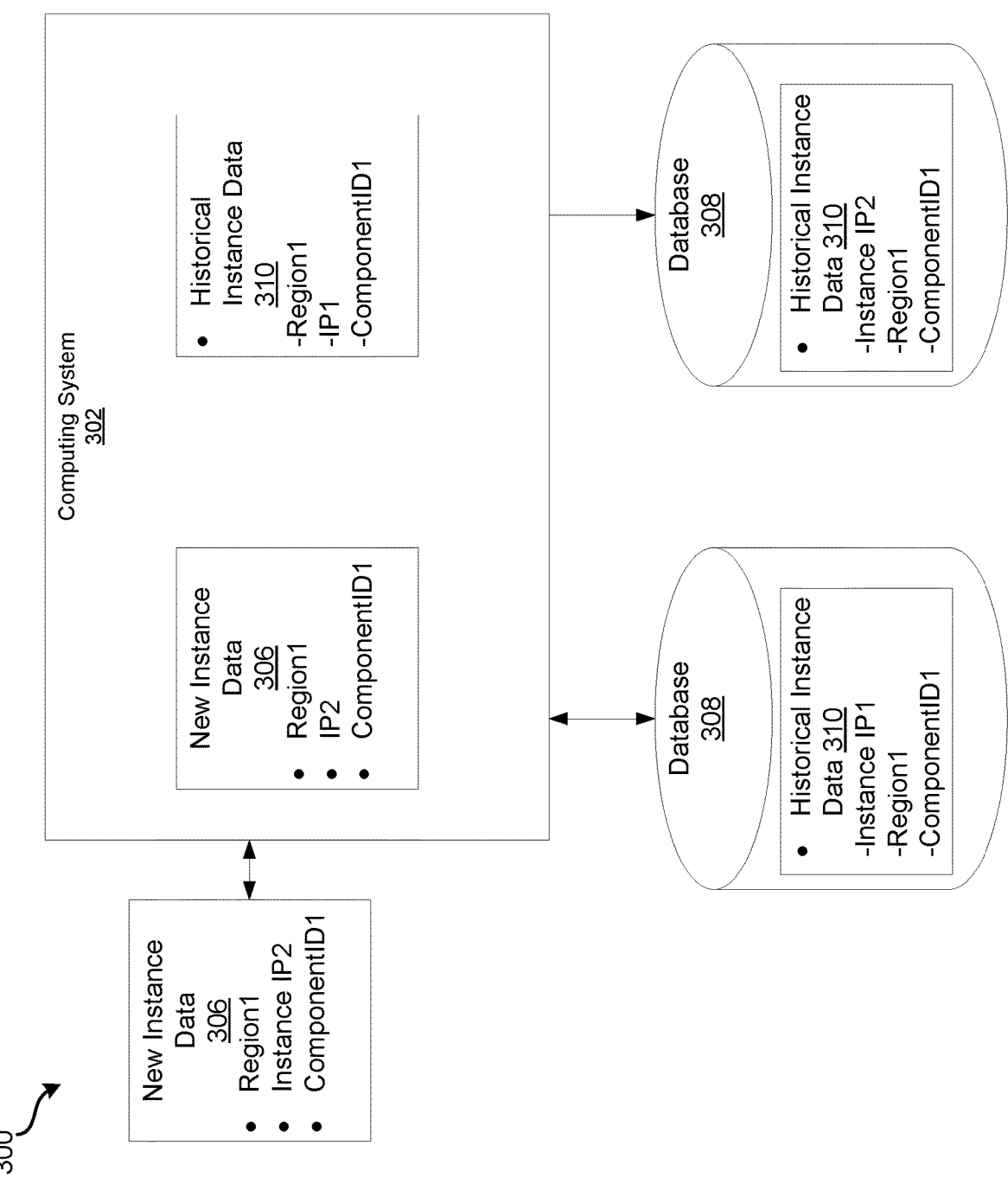
FIG. 3 illustrates a system for updating a database with data associated with a new compute instance of a 5G wireless network, according to certain embodiments.

FIG. 3 illustrates a system 300 for updating a database 308 with data associated with a new compute instance of a 5G wireless network, according to certain embodiments. The system 300 may be similar to some or all of the system 100 in FIG. 1 and include similar components and functionalities. The system 300 may work in conjunction with the system 200 in order to discover new compute instances within the 5G wireless network. The system 300 may include a computing system 302 and a database 308. The computing system 302 may access new instance data 306 via an instance list such as the instance list 120 in FIG. 1. The new instance data 306 may be associated with a recently instantiated compute instance, such as the new compute instance 209 in FIG. 2. The database 308 may be a relational database, storing data relating to a historical instance.

In the example shown in FIG. 3, the new compute instance may be a re-instantiation of a historical compute instance. The new compute instance may host one or more network components for providing a 5G wireless network The new instance data 306 may include a region identifier (1), and instance IP (2) a component ID (1), and other data associated with the new compute instance and/or network components hosted thereon. The database 308 may include historical instance data 310. The historical instance data 310 may include the region ID (1), an instance IP (1), and the component ID (1). The computing system 302 may therefore determine that the because the component ID and the region ID included in the new instance data 306 and in the historical instance data 310 are the same, that the new compute instance indicated in the new instance data 306 is a re-instantiation of a previous compute instance. Therefore, the computing system 302 may update the database 308 such that the new instance IP (2) is included in the historical instance data 310. In other examples, the component ID may be different, but the instance IP the same. The computing system 302 may therefore still determine that the new compute instance indicated in the new instance data 306 is a re-instantiation of the previous compute instance. The database 308 may then be updated to include the relevant information. The database 308 may also be updated to include any cluster information associated with the region and/or compute instances. One of ordinary skill in the art would recognize many different possibilities and configurations.

Figure 4:
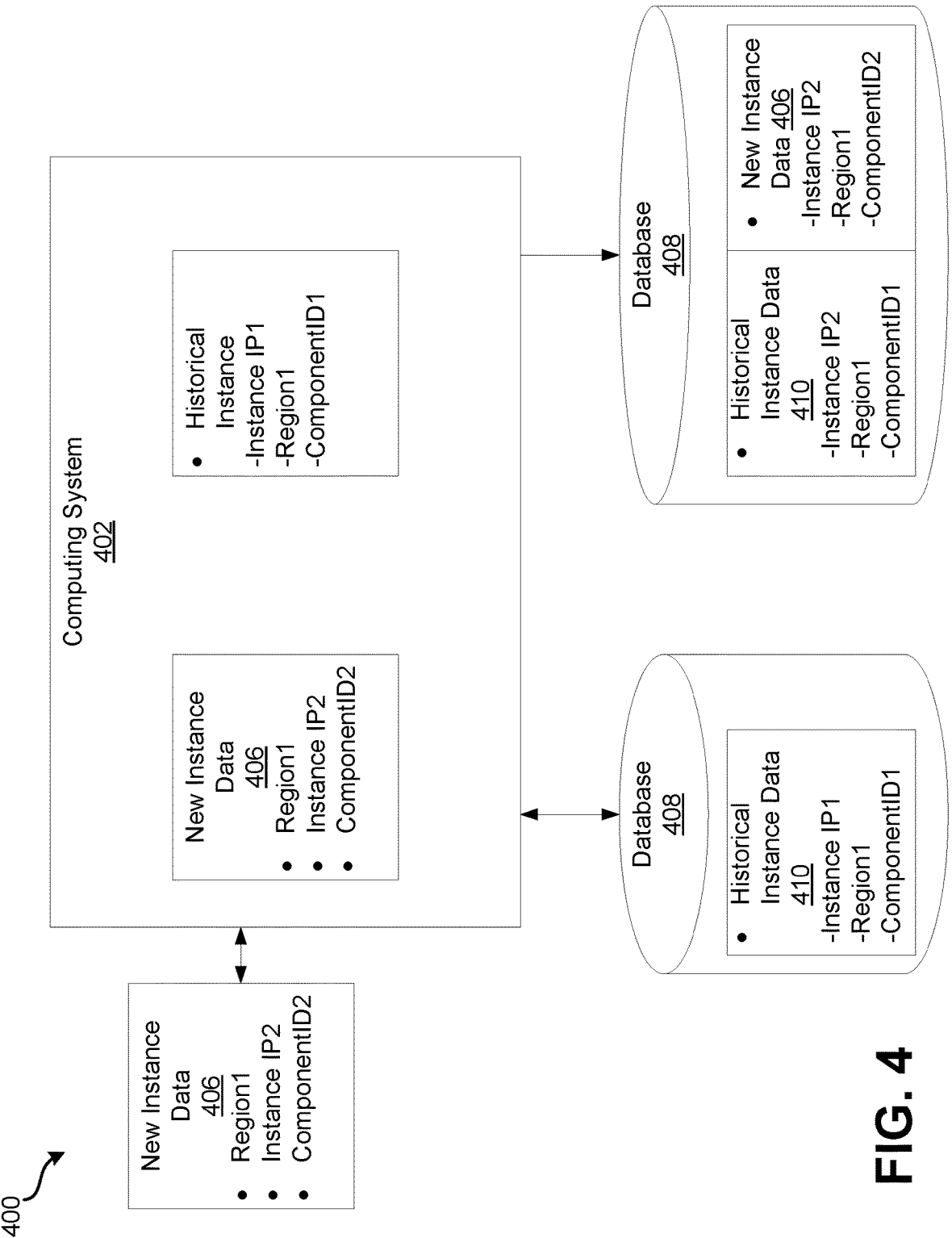
FIG. 4 illustrates a system for updating a database with data associated with a new compute instance of a 5G wireless network, according to certain embodiments.

FIG. 4 illustrates a system 400 for updating a database 408 with data associated with a new compute instance of a 5G wireless network, according to certain embodiments. The system 400 may be similar to some or all of the system 100 in FIG. 1 and include similar components and functionalities. The system 400 may work in conjunction with the system 200 in order to discover new compute instances within the 5G wireless network. The system 400 may work in addition to or as an alternative to the system 300 in FIG. 3. The system 400 may include a computing system 402 and a database 408. The computing system 402 may access new instance data 406 via an instance list such as the instance list 120 in FIG. 1. The new instance data 406 may be associated with a recently instantiated compute instance, such as the new compute instance 209 in FIG. 2. The database 3408 may be a relational database, storing data relating to a historical instance.

In the example shown in FIG. 4, the new compute instance may be a new instantiation of a compute instance. The new compute instance may host one or more network components for providing a 5G wireless network. The new instance data 406 may include a region identifier (1), and instance IP (2) a component ID (2), and other data associated with the new compute instance and/or network components hosted thereon. The database 408 may include historical instance data 410. The historical instance data 410 may include the region ID (1), an instance IP (1), and the component ID (1). The computing system 402 may therefore determine that the because the component ID and the instance IP in the new instance data 406 differs from that in the historical instance data 410, the new compute instance indicated in the new instance data 406 is not a re-instantiation of a previous compute instance. The computing system 402 may cause an entry to be made in the database 408 corresponding to the new instance data 406. The database 408 may also be updated to include any cluster information associated with the region and/or compute instances. The database 408 may therefore include an updated record of compute instances and any network components hosted thereon.

Figure 5:
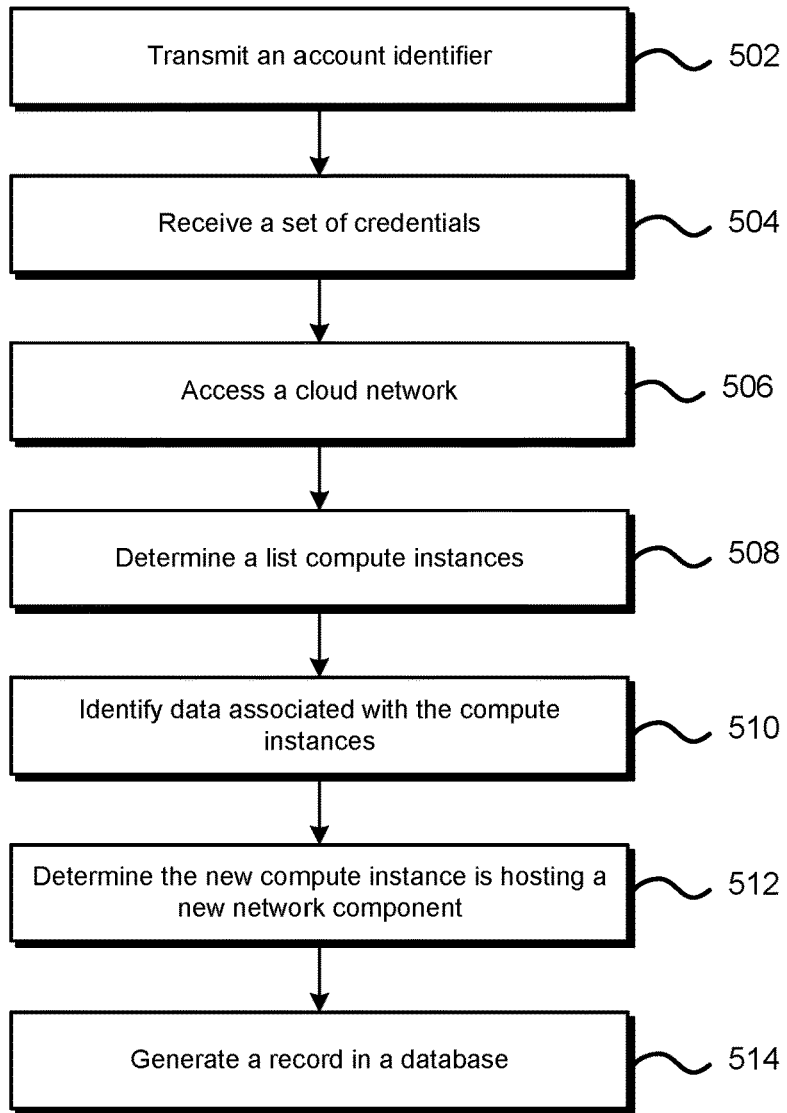
FIG. 5 illustrates a flowchart of a method for discovering a new compute instances and network components, according to certain embodiments.

FIG. 5 illustrates a flowchart of a method 500 for discovering a new compute instances and network components, according to certain embodiments. The method 500 may be performed by any or all of the systems described herein, such as the system 100 described in FIG. 1. The steps of the method 500 may be performed in a different order than that shown and described in relation to FIG. 5, and/or may be combined with other steps. In some embodiments, some steps may be skipped altogether.

At step 502, the method 500 may include transmitting, by a computing system, an account identifier corresponding to an account associated with a cloud network to a credentialing service associated with the account. The computing system may be implemented by a 5G wireless network provider. The 5G wireless network provider may provider cellular service via a distributed cloud based architecture via an O-RAN. The account may be associated with an entity that provides a network component for the 5G wireless network provider. The account ID may be associated with one region within the cloud network, associated with the entity or the account ID may be associated with multiple regions. The credentialing service may be implemented within the region, or may be implemented outside the cloud network or in a different region.

At step 504, the method 500 may include receiving, by the computing system, a set of credentials from the credentialing service. The set of credentials may authorize the computing system to access one or more regions associated with the entity and/or the 5G wireless network provider. The set of credentials may expire at a set expiry time. For example, the expiry time may be 8 hours, 2 hours, 1 hour, etc.

At step 506, the method 500 may include accessing, by the computing system, the cloud network. The cloud network may include a plurality of network components of the 5G wireless network hosted on one or more compute instances. For example, the network components may include one or more software components associated with an entity that provides functionality to the 5G wireless network provider (e.g., back-end services etc.). The network components may also include one or more network functions, such as a CHF), an SMF, and other such network functions. The plurality of network components may be part of the O-RAN used to provide cellular service by the 5G wireless network provider.

At step 508, the method 500 may include determining, by the computing system, a list of the one or more compute instances within the cloud network. The list of the one or more compute instances may be similar to the instance list 120 in FIG. 1. At step 510, the method 500 may include identifying, by the computing system, data associated with each of the one or more compute instances. The computing system may utilize the list to determine the data associated with the one or more compute instances. The list may include data relating to the region of the cloud network, such as a node name identifying the region, a namespace (e.g., naming conventions of any compute instances instantiated within the region). The list may also include data relating to the compute instances instantiated on the cloud network (and/or a region or regions thereof) such as an IP address of each compute instance a cluster name associated with the compute instances, and other such data. The list may further include data relating to any network components hosted on the compute instances such as a component type, component name, port numbers, IP addresses of the network components, etc.

In some embodiments, the method 500 may also include determining, by the computing system, a set of clusters within a region of the cloud network. For each of the set of clusters. The method may include determining, by the computing system, a set of compute instances of the one or more compute instances, the set of compute instances associated with the cluster. The method 500 may also include updating, by the computing system, the database such that the records associated with the one or more compute instances are organized by cluster.

At step 512, the method 500 may include determining, by the computing system, that a new compute instance of the one or more compute instances is recently instantiated. For example, in relation to FIG. 2, the computing system may identify the new compute instance 209 as a recently instantiated compute instance. To determine that the new compute instance is recently instantiated, the computing system may access historical instance data, including node names, IP addresses, component IDs, etc. discovered in a previous execution of the method 500. The computing system may then identify that the new compute instance is a newly instantiated compute instance, hosting one or more new network components. Alternatively, the computing system may identify that the new compute instance is a re-instantiated compute instance of a previous compute instance.

At step 514, the method 500 may include generating, by the computing system, a record in a database comprising at least a portion of the data associated with the new compute instance. The record in the database may indicate that the new compute instance is a newly instantiated compute instance (e.g., as is described in relation to FIG. 4). In other embodiments, the computing system may determine that the new network component corresponds to a historical entry in the database, and that a new network component is hosted on a re-instantiated compute instance. The computing system may then update the historical entry to include at least some of the data associated with the re-instantiated compute instance and/or the new network component (e.g., as is described in relation to FIG. 3).

In some embodiments, the method 500 may include determining, by the computing system, that a new network component is instantiated on a compute instance of the one or more compute instances. For example, the new network component may be instantiated in order to expand cellular service in a particular area. The method 500 may then include generating, by the computing system, a second record in the database comprising data associated with the new network component. The new network component may be included in a CU or a DU.

Figure 6A:
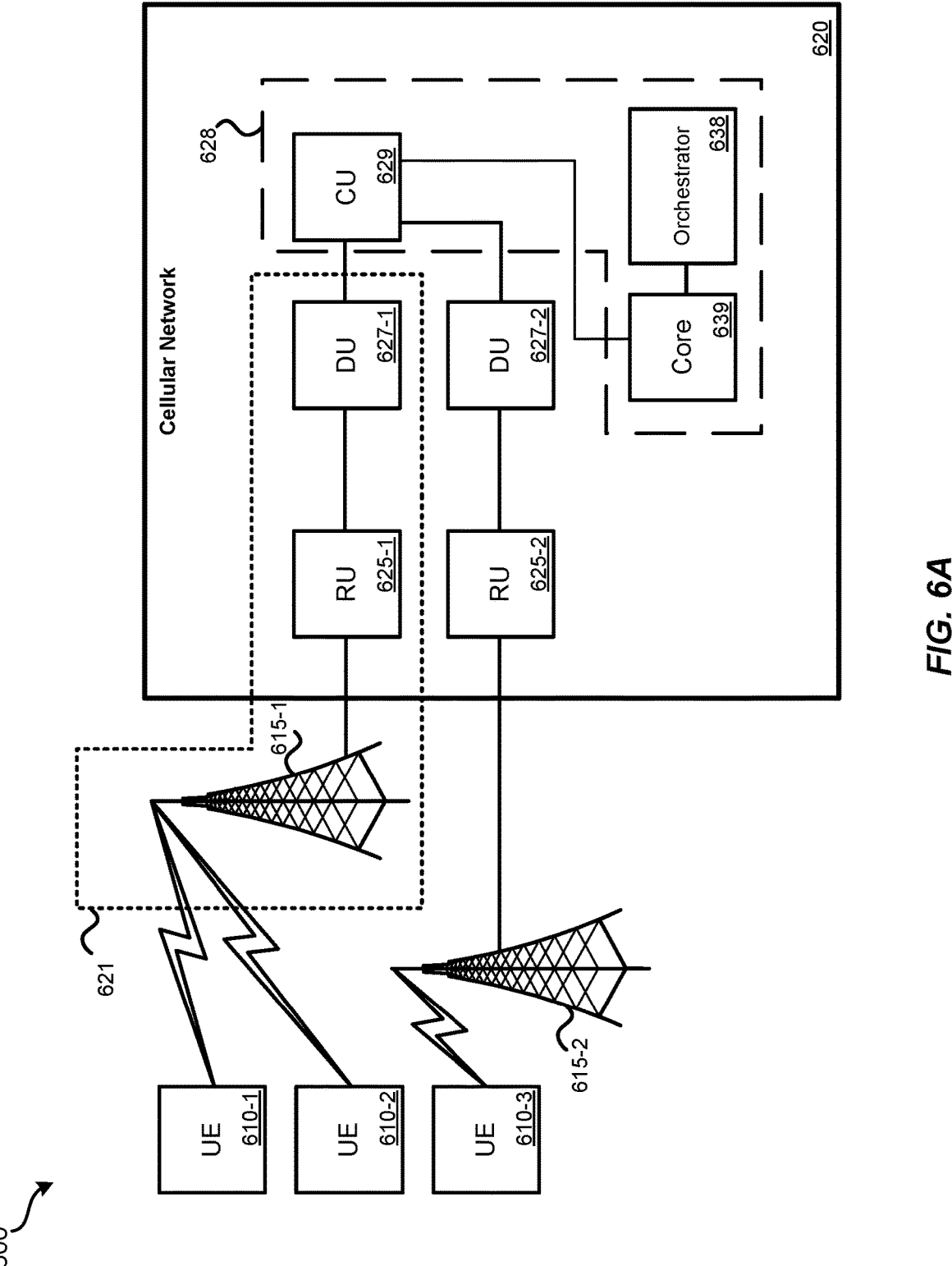
FIG. 6A illustrates an embodiment of a cellular network system, according to certain embodiments.

FIG. 6A illustrates an embodiment of a cellular network system 600 ("system 600"), according to certain embodiments. System 600 can include a fifth generation (5G) New Radio (NR) cellular network; other types of cellular networks, such as fourth generation (4G) long-term evolution (LTE) cellular network, sixth generation (6G) cellular network, seventh generation (7G) cellular network, etc. are also possible. System 600 can include: UE 610 (UE 610-1, UE 610-2, UE 610-3); base station 615; cellular network 620; radio units 625 ("RUs 625"); distributed units 627 ("DUs 627"); centralized unit 629 ("CU 629"); core 639, and orchestrator 638. FIG. 6A represents a component level view. In a virtualized open radio access network (O-RAN), because components can be implemented as software in the cloud, except for components that receive and transmit RF, the functionality of various components can be shifted among different servers, for which the hardware may be maintained by a separate (e.g., public) cloud-service provider, to accommodate where the functionality of such components is needed, such as detailed in relation to FIG. 7.

UE 610 can represent various types of end-user devices, such as smartphones, cellular modems, cellular-enabled computerized devices, sensor devices, manufacturing equipment, gaming devices, access points (APs), any computerized device capable of communicating via a cellular network, etc. UE can also represent any type of device that has incorporated a cellular (e.g., 5G) interface, such as a 5G modem. Examples include sensor devices, Internet of Things (IoT) devices, manufacturing robots; unmanned aerial (or land-based) vehicles, network-connected vehicles, environmental sensors, etc. UE 610 may use RF to communicate with various base stations of cellular network 620. Two base stations 615 (BS 615-1, 615-2) are illustrated. Real-world implementations of system 600 can include many (e.g., hundreds, thousands) base stations, and many RUs, DUs, and CUs. BS 615 can include one or more antennas that allow RUs 625 to communicate wirelessly with UEs 610. RUs 625 can represent an edge of cellular network 620 where data is transitioned to wireless communication. In some implementations, the radio access technology (RAT) used by RU 625 is 5G New Radio (NR). Other implementations use other RAT, such as 4G Long Term Evolution (LTE). The remainder of cellular network 620 may be based on an exclusive 5G architecture, a hybrid 4G/5G architecture, a 4G architecture, or some other cellular network architecture. Base station equipment 621 may include an RU (e.g., RU 625-1) and a DU (e.g., DU 627-1) located on site at the base station. In some embodiments, the DU may be physically remote from the RU. For instance, multiple DUs may be housed at a central location and connected to geographically distant (e.g., within a couple of kilometers) RUs.

One or more RUs, such as RU 625-1, may communicate with DU 627-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, "band 71" (a radiofrequency band near 600 Megahertz allocated for cellular communications). One or more DUs, such as DU 627-1, may communicate with CU 629. Collectively, RUs, DUs, and CUs create a gNodeB, which serves as the radio access network (RAN) of cellular network 620. CU 629 can communicate with core 639. The specific architecture of cellular network 620 can vary by embodiment. Edge cloud server systems outside of cellular network 620 may communicate, either directly, via the Internet, or via some other network, with components of cellular network 620. For example, one or more DUs 627-1 may be able to communicate with an edge cloud server system without routing data through CU 629 or core 639.

At a high level, the various components of a gNodeB can be understood as follows: RUs perform RF-based communication with UE. DUs support lower layers of the protocol stack such as the radio link control (RLC) layer, the medium access control (MAC) layer, and the physical communication layer. CUs support higher layers of the protocol stack such as the service data adaptation protocol (SDAP) layer, the packet data convergence protocol (PDCP) layer and the radio resource control (RRC) layer. A single CU can provide service to multiple co-located or geographically distributed DUs. A single DU can communicate with multiple RUs.

Figure 6B:
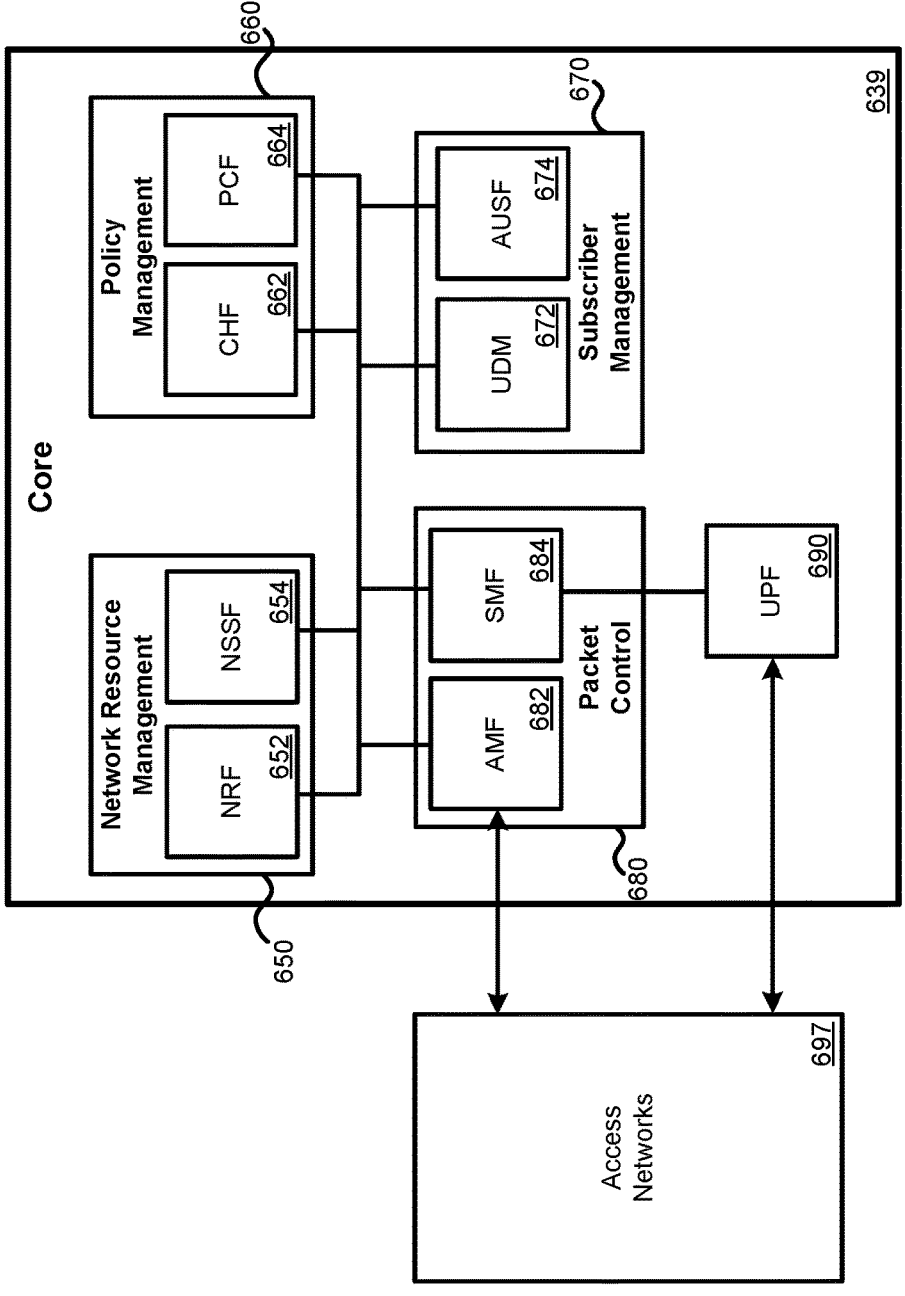
FIG. 6B illustrates an exemplary core, according to certain embodiments.
Figure 6B:

Further detail regarding exemplary core 639 is provided in relation to FIG. 6B. FIG. 6B illustrates an exemplary core 639, according to certain embodiments. The exemplary core 639 can be physically distributed across data centers or located at a central national data center (NDC), such as detailed in relation to FIG. 7, can perform various core functions of the cellular network. Core 639 can include: network resource management components 650; policy management components 660; subscriber management components 670; and packet control components 680. Individual components may communicate via a bus, thus allowing various components of core 639 to communicate with each other directly. Core 639 is simplified to show some key components. Implementations can involve additional components.

Network resource management components 650 can include: Network Repository Function (NRF) 652 and Network Slice Selection Function (NSSF) 654. NRF 652 can allow 5G network functions (NFs) to register and discover each other via a standards-based application programming interface (API). NSSF 654 can be used by AMF 682 to assist with the selection of a network slice that will serve a particular UE (e.g., UEs 610 of FIG. 6A).

Policy management components 660 can include: Charging Function (CHF) 662 and Policy Control Function (PCF) 664. CHF 662 allows charging services to be offered to authorized network functions. Converged online and offline charging can be supported. PCF 664 allows for policy control functions and the related 5G signaling interfaces to be supported.

Subscriber management components 670 can include: Unified Data Management (UDM) 672 and Authentication Server Function (AUSF) 674. UDM 672 can allow for generation of authentication vectors, user identification handling, NF registration management, and retrieval of UE individual subscription data for slice selection. AUSF 674 performs authentication with UEs.

Packet control components 680 can include: Access and Mobility Management Function (AMF) 682 and Session Management Function (SMF) 684. AMF 682 can receive connection- and session-related information from UEs and is responsible for handling connection and mobility management tasks. SMF 684 is responsible for interacting with the decoupled data plane, creating updating and removing Protocol Data Unit (PDU) sessions, and managing session context with the User Plane Function (UPF).

User plane function (UPF) 690 can be responsible for packet routing and forwarding, packet inspection, quality of service (QOS) handling, and external PDU sessions for interconnecting with a Data Network (DN) (e.g., the Internet) or various access networks 697. Access networks 697 can include the RAN of cellular network 620 of FIG. 6A.

While FIGS. 6A and 6B illustrate various components of cellular network 620, it should be understood that other embodiments of cellular network 620 can vary the arrangement, communication paths, and specific components of cellular network 620. While RU 625 may include specialized radio access componentry to enable wireless communication with UE 610, other components of cellular network 620 may be implemented using either specialized hardware, specialized firmware, and/or specialized software executed on a general-purpose server system. In a virtualized arrangement, specialized software on general-purpose hardware may be used to perform the functions of components such as DU 627, CU 629, and core 639. Functionality of such components can be co-located or located at disparate physical server systems. For example, certain components of core 639 may be co-located with components of CU 629.

Returning to FIG. 6A, some O-RAN implementations of the DUs 627, CU 629, core 639, and/or orchestrator 638 are implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 600, cloud-based cellular network components A128 include CU 629, core 639, and orchestrator 638. In some embodiments, DUs 627 may be partially or fully added to cloud-based cellular network components 628. Such cloud-based cellular network components 628 may be executed as specialized software executed by underlying general-purpose computer servers. Cloud-based cellular network components 628 may be executed on a public third-party cloud-based computing platform or a cloud-based computing platform operated by the same entity that operates the RAN. A cloud-based computing platform may have the ability to devote additional hardware resources to cloud-based cellular network components 628 or implement additional instances of such components when requested. A "public" cloud-based computing platform refers to a platform where various unrelated entities can each establish an account and separately utilize the cloud computing resources, the cloud computing platform managing segregation and privacy of each entity's data.

Kubernetes, or some other container orchestration platform, can be used to create and destroy the logical DU, CU, or 5G core units and subunits, as needed, for the cellular network 620 to function properly. Kubernetes allows for container deployment, scaling, and management. As an example, if cellular traffic increases substantially in a region, an additional logical DU or components of a DU may be deployed in a data center near where the traffic is occurring without any new hardware being deployed; rather, processing and storage capabilities of the data center would be devoted to the needed functions. When the need for the logical DU or subcomponents of the DU no longer exists (i.e., when traffic subsequently decreases), Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 638. Orchestrator 638 can represent various software processes executed by underlying computer hardware. Orchestrator 638 can monitor cellular network 620 and determine the amount and location at which cellular network functions should be deployed to meet or attempt to meet service level agreements (SLAs) across slices of the cellular network.

Orchestrator 638 can allow for the instantiation of new cloud-based components of cellular network 620. As an example, to instantiate a new DU, orchestrator 638 can perform a pipeline of calling the DU code from a software repository incorporated as part of, or separate from, cellular network 620; pulling corresponding configuration files (e.g., helm charts); creating Kubernetes nodes/pods; loading DU containers; configuring the DU; and activating other support functions (e.g., Prometheus, instances/connections to test tools).

A network slice functions as a virtual network operating on cellular network 620. Cellular network 620 is shared with some number of other network slices, such as hundreds or thousands of network slices. Communication bandwidth and computing resources of the underlying physical network can be reserved for individual network slices, thus allowing the individual network slices to reliably meet particular service level agreement (SLA) levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, such allocations also account for resource limitations, such as to avoid allocation of an excess of resources to any particular UE group and/or application. Further, a cost may be attached to cellular slices: the greater the amount of resources dedicated, the greater the cost to the user; thus, optimization between performance and cost is desirable.

Particular network slices may only be reserved in particular geographic regions. For instance, a first set of network slices may be present at RU 625-1 and DU 627-1; and a second set of network slices, which may only partially overlap or may be wholly different from the first set, may be reserved at RU 625-2 and DU 627-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

As illustrated in FIG. 6A, UE 610 may be operating on one or more production slices of cellular network 620. As detailed later in this document, a UE that functions on a particular entity's local network may be assigned to a slice particular to the entity or a slice that provides a particular QoE for tasks to be performed by the entity's UE.

Components such as DUs 627, CU 629, orchestrator 638, and core 639 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 7:
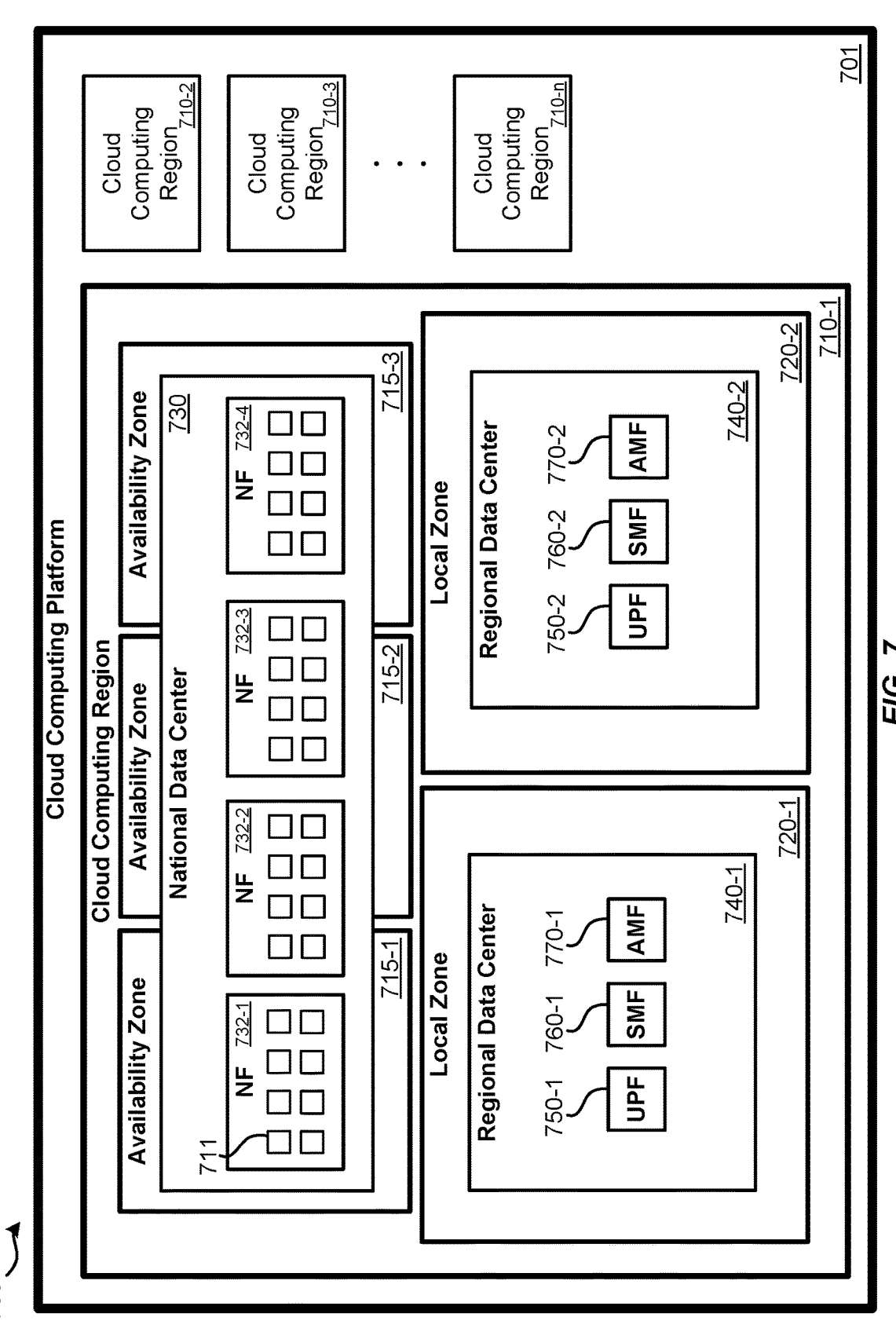
FIG. 7 illustrates an embodiment of a cellular network core network topology, according to certain embodiments.

FIG. 7 illustrates an embodiment of a cellular network core network topology 700 as implemented on a public cloud-computing platform, according to certain embodiments. The cellular network core network topology 700 can be an implementation of the core 639 of FIGS. 6A and/or 6B. Cellular network core network topology 700 can represent how logical cellular network groups are distributed across cloud computing infrastructure of cloud computing platform 701. Cloud computing platform 701 can be logically and physically divided up into various different cloud computing regions 710. Each of cloud computing regions 710 can be isolated from other cloud computing regions to help provide fault tolerance, fail-over, load-balancing, and/ or stability and each of cloud computing regions 710 can be composed of multiple availability zones, each of which can be a separate data center located in general proximity to each other (e.g., within 600 miles). Further, each of cloud computing regions 710 may provide superior service to a particular geographic region based on physical proximity. For example, cloud computing region 710-1 may have its datacenters and hardware located in the northeast of the United States while cloud computing region 710-2 may have its datacenters and hardware located in California. For simplicity, the details of the cellular network as executed in only cloud computing region 710-1 is illustrated. Similar components may be executed in other cloud computing regions of cloud computing regions 710 (710-2, 710-3, 710-n).

In other embodiments, cloud computing platform 701 may be a private cloud computing platform. A private cloud computing platform may be maintained by a single entity, such as the entity that operates the hybrid cellular network. Such a private cloud computing platform may be only used for the hybrid cellular network and/or for other uses by the entity that operates the hybrid cellular network (e.g., streaming content delivery).

Each of cloud computing regions 710 may include multiple availability zones 715. Each of availability zones 715 may be a discrete data center or group of data centers that allows for redundancy that allows for fail-over protection from other availability zones within the same cloud computing region. For example, if a particular data center of an availability zone experiences an outage, another data center of the availability zone or separate availability zone within the same cloud computing region can continue functioning and providing service. A logical cellular network component, such as a national data center, can be created in one or across multiple availability zones 715. For example, a database that is maintained as part of NDC 730 may be replicated across availability zones 715; therefore, if an availability zone of the cloud computing region is unavailable, a copy of the database remains up-to-date and available, thus allowing for continuous or near continuous functionality.

On a (e.g., public) cloud computing platform, cloud computing region 710-1 may include the ability to use a different type of data center or group of data centers, which can be referred to as local zones 720. For instance, a client, such as a provider of the hybrid cloud cellular network, can select from more options of the computing resources that can be reserved at an availability zone 715 compared to a local zone 720. However, a local zone 720 may provide computing resources nearby geographic locations where an availability zone 715 is not available. Therefore, to provide low latency, certain network components, such as regional data centers 740, can be implemented at local zones 720 rather than availability zones 715. In some circumstances, a geographic region can have both a local zone 720 and an availability zone 715.

In the topology of a 5G NR cellular network, 5G core functions of core 639 can logically reside as part of a national data center (NDC) 730. NDC 730 can be understood as having its functionality existing in cloud computing region 710-1 across multiple availability zones 715. At NDC 730, various network functions, such as NFs 732, are executed. For illustrative purposes, each NF 732, whether at NDC 730 or elsewhere located, can be comprised of multiple sub-components, referred to as pods (e.g., pod 711) that are each executed as a separate process by the cloud computing region 710. The illustrated number of pods 711 is merely an example; fewer or greater numbers of pods 711 may be part of the respective 5G core functions. It should be understood that in a real-world implementation, a cellular network core, whether for 5G or some other standard, can include many more network functions. By distributing NFs 732 across availability zones 715, load-balancing, redundancy, and fail-over can be achieved. In local zones 720, multiple regional data centers 740 can be logically present. Each of regional data centers 740 may execute 5G core functions for a different geographic region or group of RAN components. As an example, 5G core components that can be executed within an RDC, such as RDC 740-1, may be: UPFs 750, SMFs 760, and AMFs 770. While instances of UPFs 750 and SMFs 760 may be executed in local zones 720, SMFs 760 may be executed across multiple local zones 720 for redundancy, processing load-balancing, and fail-over.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks. For example, executing instructions stored in the non-transitory computer-readable medium causes the processors to perform steps of methods and/or to implement features of components described herein.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method of discovering components of a wireless network, the method comprising:

transmitting, by a computing system, an account identifier corresponding to an account associated with a cloud network to a credentialing service associated with the account;

receiving, by the computing system, a set of credentials from the credentialing service;

accessing, by the computing system, the cloud network, the cloud network comprising a plurality of network components of the wireless network, the plurality of network components hosted on one or more compute instances;

determining, by the computing system, a list of the one or more compute instances within the cloud network;

identifying, by the computing system, data associated with each of the one or more compute instances;

determining, by the computing system, that a new compute instance of the one or more compute instances is recently instantiated;

generating, by the computing system, a record in a database comprising at least a portion of the data associated with the new compute instance;

determining, by the computing system, that the new compute instance is a re-instantiated compute instance corresponding to a historical entry in the database, and that a new network component is hosted on the re-instantiated compute instance; and updating, by the computing system, the historical entry to include at least some of the data associated with the re-instantiated compute instance and/or the new network component.

2. The method of claim 1, wherein determining, by the computing system, a list of the one or more compute instances within the cloud network further comprises:

determining, by the computing system, a set of clusters within a region of the cloud network;

for each of the set of clusters:

determining, by the computing system, a set of compute instances of the one or more compute instances, the set of compute instances associated with the cluster; and updating, by the computing system, the database such that the records associated with the one or more compute instances are organized by cluster.

3. The method of claim 1, wherein the wireless network comprises an open radio access network.

4. The method of claim 1, wherein the data includes at least one of an internet protocol address associated with the new compute instance and a port associated the new compute instance.

5. The method of claim 1, further comprising:

determining, by the computing system, that a new network component is instantiated on a compute instance of the one or more compute instances; and generating, by the computing system, a second record in the database comprising data associated with the new network component.

6. The method of claim 5, wherein the new network component comprises at least one of a distributed unit and a centralized unit.

7. A computing system, comprising:

one or more processors; and a non-transitory computer-readable medium comprising instructions that, when executed by the one or more processors, cause the computing system to perform operations to:

transmit an account identifier corresponding to an account associated with a cloud network to a credentialing service associated with the account;

receive a set of credentials from the credentialing service;

access the cloud network, the cloud network comprising a plurality of network components of a wireless network, the plurality of network components hosted on one or more compute instances;

determine a list of the one or more compute instances within the cloud network;

identify data associated with each of the one or more compute instances;

determine that a new compute instance of the one or more compute instances is recently instantiated; and generate a record in a database comprising at least a portion of the data associated with the new compute instance;

determine that the new compute instance is a re-instantiated compute instance corresponding to a historical entry in the database, and that a new network component is hosted on a re-instantiated compute instance; and update the historical entry to include at least some of the data associated with the re-instantiated compute instance and the new network component.

8. The system of claim 7, wherein determining, by the computing system, a list of the one or more compute instances within the cloud network further comprises:

determining, by the computing system, a set of clusters within a region of the cloud network;

for each of the set of clusters:

determining, by the computing system, a set of compute instances of the one or more compute instances, the set of compute instances associated with the cluster; and updating, by the computing system, the database such that the records associated with the one or more compute instances are organized by cluster.

9. The system of claim 7, wherein the wireless network comprises an open radio access network.

10. The system of claim 7, wherein the data includes at least one of an internet protocol address associated with the new compute instance and a port associated the new compute instance.

11. The system of claim 7, wherein the set of credentials expire in eight hours.

12. The system of claim 7, wherein the plurality of network components are comprised in at least one of a distributed unit and a centralized unit.

13. The system of claim 7, wherein the system performs the operations according to a predetermined interval less than an expiry time of the set of credentials.

14. A non-transitory computer-readable medium comprising instructions that, when executed by one or more processors, cause the one or more processors to perform operations comprising:

transmitting, by a computing system, an account identifier corresponding to an account associated with a cloud network to a credentialing service associated with the account;

receiving, by the computing system, a set of credentials from the credentialing service;

accessing, by the computing system, the cloud network, the cloud network comprising a plurality of network components of a wireless network, the plurality of network components hosted on one or more compute instances;

determining, by the computing system, a list of the one or more compute instances within the cloud network;

identifying, by the computing system, data associated with each of the one or more compute instances;

determining, by the computing system, that a new compute instance of the one or more compute instances is recently instantiated; and generating, by the computing system, a record in a database comprising at least a portion of the data associated with the new compute instance;

determining, by the computing system, that the new compute instance is a re-instantiated compute instance corresponding to a historical entry in the database, and that a new network component is hosted on the re-instantiated compute instance; and updating, by the computing system, the historical entry to include at least some of the data associated with the re-instantiated compute instance and/or the new network component.

15. The non-transitory computer-readable medium of claim 14, wherein determining, by the computing system, a list of the one or more compute instances within the cloud network;

determining, by the computing system, a set of clusters within a region of the cloud network;

for each of the set of clusters:

determining, by the computing system, a set of compute instances of the one or more compute instances, the set of compute instances associated with the cluster; and updating, by the computing system, the database such that the records associated with the one or more compute instances are organized by cluster.

16. The non-transitory computer-readable medium of claim 14, wherein the wireless network comprises an open radio access network.

17. The non-transitory computer-readable medium of claim 14, wherein the plurality of network components are comprised in at least one of a distributed unit and a centralized unit.

* * * * *